United States Patent
Kim et al.

(10) Patent No.: US 10,849,111 B2
(45) Date of Patent: Nov. 24, 2020

(54) METHOD AND APPARATUS FOR TRANSMITTING CHANNEL STATE INFORMATION IN FRAME STRUCTURE OF SHORT TRANSMISSION TIME INTERVAL

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 7 days.

(21) Appl. No.: 16/335,717

(22) PCT Filed: Sep. 22, 2017

(86) PCT No.: PCT/KR2017/010496
§ 371 (c)(1),
(2) Date: Mar. 22, 2019

(87) PCT Pub. No.: WO2018/056760
PCT Pub. Date: Mar. 29, 2018

(65) Prior Publication Data
US 2019/0394768 A1    Dec. 26, 2019

(30) Foreign Application Priority Data

Sep. 23, 2016 (KR) .......... 10-2016-0122509
Sep. 15, 2017 (KR) .......... 10-2017-0118923

(51) Int. Cl.
*H04W 72/04* (2009.01)
*H04B 7/06* (2006.01)
(Continued)

(52) U.S. Cl.
CPC ...... *H04W 72/0413* (2013.01); *H04B 7/0632* (2013.01); *H04L 1/0026* (2013.01); *H04W 24/10* (2013.01); *H04W 72/0446* (2013.01)

(58) Field of Classification Search
CPC .................... H04W 72/0446; H04W 24/10
See application file for complete search history.

(56) References Cited

U.S. PATENT DOCUMENTS

2016/0095104 A1    3/2016 Chen et al.
2016/0095105 A1    3/2016 Chen et al.
(Continued)

OTHER PUBLICATIONS

Huawei et al., "Discussion on CSI feedback for short TTI", R1-166157, 3GPP TSG RAN WG1 Meeting #86, Gothenburg, Sweden, Aug. 22-26, 2016, pp. 1-3.
(Continued)

*Primary Examiner* — Angel T Brockman
(74) *Attorney, Agent, or Firm* — IP Legal Services, LLC

(57) ABSTRACT

Provided are a method and an apparatus for transmitting, by a terminal, channel state information (CSI) in a frame structure of a short transmission time interval (sTTI). The method includes: receiving type information of a short transmission time interval from a base station through an RRC signaling; determining a channel state information transmission period of a short transmission time interval on the basis of the type information of the short transmission time interval; determining channel state information to be transmitted to the base station according to a channel state information transmission period of a general transmission time interval and the channel state information transmission period of the short transmission time interval; and transmitting the channel state information to be transmitted to the base station through an uplink control channel of a short transmission time interval, wherein the general transmission
(Continued)

time interval is set to 12 or 14 symbols, and the short transmission time interval is set to 2, 4, or 7 symbols.

12 Claims, 12 Drawing Sheets

(51) Int. Cl.
*H04W 24/10* (2009.01)
*H04L 1/00* (2006.01)

(56) References Cited

U.S. PATENT DOCUMENTS

| | | |
|---|---|---|
| 2016/0095137 A1 | 3/2016 | Chen et al. |
| 2016/0119101 A1* | 4/2016 | Liu ........................ H04W 24/10 370/280 |
| 2016/0205676 A1 | 7/2016 | Chen et al. |
| 2018/0192418 A1 | 7/2018 | Chen et al. |
| 2018/0242307 A1 | 8/2018 | Chen et al. |

OTHER PUBLICATIONS

LG Electronics, "sPUCCH design for CSI feedback with shortened TTI length", R1-166861, 3GPP TSG RAN WG1 Meeting #86, Gothenburg, Sweden, Aug. 22-26, 2016, pp. 1-5.

HTC, "Reduced timing for retransmission request", R1-167342, 3GPP TSG RAN WG1 Meeting #86, Gothenburg, Sweden Aug. 22-26, 2016, pp. 1-4.

* cited by examiner

FIG.2
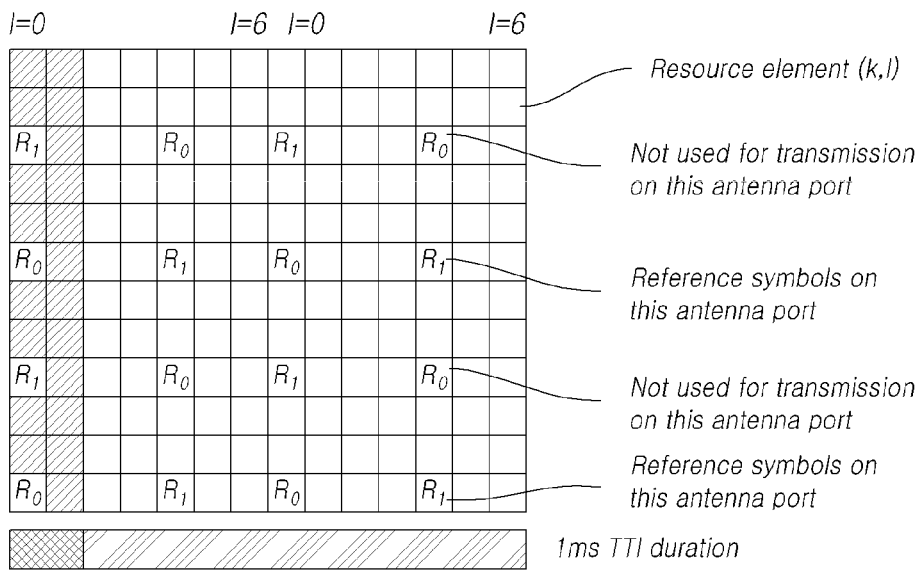
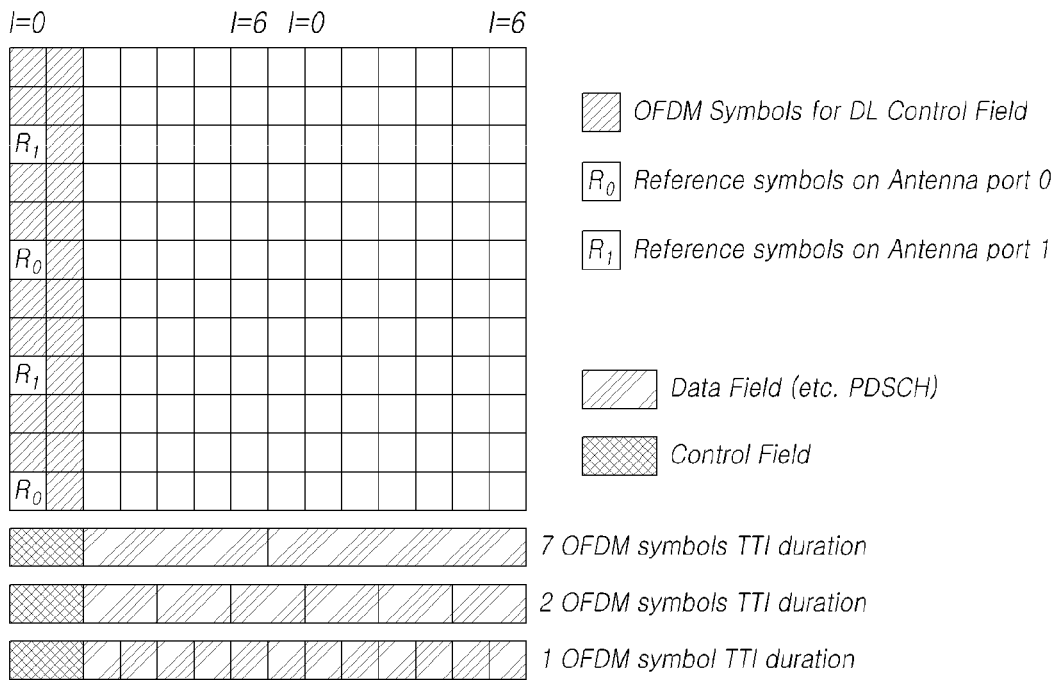

Normal CP case

METHOD AND APPARATUS FOR TRANSMITTING CHANNEL STATE INFORMATION IN FRAME STRUCTURE OF SHORT TRANSMISSION TIME INTERVAL

CROSS REFERENCE TO RELATED APPLICATIONS

This application is a National Stage Patent Application of PCT International Patent Application No. PCT/KR2017/010496 (filed on Sep. 22, 2017) under 35 U.S.C. § 371, which claims priority to Korean Patent Application Nos. 10-2016-0122509 (filed on Sep. 23, 2016) and 10-2017-0118923 (filed on Sep. 15, 2017), the teachings of which are incorporated herein in their entireties by reference.

TECHNICAL FIELD

The present disclosure relates to the operation of a user equipment and a base station for transmitting and receiving channel state information in a frame structure with a short transmission time interval in the 3rd generation partnership project (GPP) long term evolution (LTE)/LTE-A system.

BACKGROUND ART

Studies and discussions have been in progress for reducing latency in the 3GPP LTE/LTE-Advanced system. The main purpose of the latency reduction is to standardize the operation of a short transmission time interval (hereinafter referred to as "short TTI" or "sTTI") to improve the throughput of the TCP.

Such an sTTI frame structure is configured with the typical frame structure of the LTE/LTE-Advanced. That is, the sTTI frame structure is configured as 2, 4, or 7 symbol units in TTI=1 ms=14/12 OFDM symbols. Thus, latency is reduced, and the data throughput is improved by transmitting/receiving data based on the sTTI frame structure.

To this end, discussions are in progress for the performance of the short TTI. Furthermore, discussions are in progress for feasibility, performance, backward compatibility, and the like, of a TTI length between 0.5 ms and a single OFDM symbol.

Although studies on the physical layer for such a short TTI are in progress, there is no specific procedure introduced for estimation and feedback of channel state information in the short TTI.

DETAILED DESCRIPTION OF THE INVENTION

Technical Problem

It is an object of the present disclosure to provide methods of a user equipment and a base station for determining a channel state information measurement period and channel state information to transmit in a short transmission time interval based frame structure.

Technical Solution

In accordance with at least one embodiment to address such issues, a method of a user equipment is provided for transmitting channel state information (CSI) in a frame structure with a short transmission time interval (sTTI). The method includes: receiving information on a type of the short transmission time interval from a base station through radio resource control (RRC) signaling, determining a short transmission time interval based channel state information transmission period based on the information on the type of the short transmission time interval, determining channel state information to be transmitted to the base station according to a typical transmission time interval based channel state information transmission period and the short transmission time interval based channel state information transmission period, and transmitting the channel state information to be transmitted to the base station through an uplink control channel in the short transmission time interval, wherein the typical transmission time interval is configured with 12 or 14 symbols, and the short transmission time interval is configured with 2, 4 or 7 symbols.

In accordance with at least one embodiment, a method of a base station is provided for receiving channel state information (CSI) in a frame structure with a short transmission time interval (sTTI). The method includes: transmitting information on a type of the short transmission time interval to a user equipment through radio resource control (RRC) signaling, receiving channel state information determined according to a typical transmission time interval based channel state information transmission period and a short transmission time interval based channel state information transmission period from the user equipment, and configuring downlink data transmission for the user equipment and determining relevant parameters based on the received channel state information, wherein the channel state information is determined based on the information on the type of the short transmission time interval, wherein the typical transmission time interval is configured with 12 or 14 symbols, and the short transmission time interval is configured with 2, 4 or 7 symbols.

In accordance with at least one embodiment, a user equipment is provided for transmitting channel state information (CSI) in a frame structure with a short transmission time interval (sTTI). The user equipment includes: a receiver configured to receive information on a type of the short transmission time interval through radio resource control (RRC) signaling from a base station, a controller configured to determine a short transmission time interval based channel state information transmission period based on the information on the type of the short transmission time interval and determine channel state information to be transmitted to the base station according to a typical transmission time interval based channel state information transmission period and the short transmission time interval based channel state information transmission period, and a transmitter configured to transmit the channel state information to be transmitted to the base station through an uplink control channel in the short transmission time interval, wherein the typical transmission time interval is configured with 12 or 14 symbols, and the short transmission time interval is configured with 2, 4 or 7 symbols.

In accordance with at least one embodiment, a base station is provided for receiving channel state information (CSI) in a frame structure with a short transmission time interval (sTTI). The base station includes: a transmitter configured to transmit information on a type of the short transmission time interval through radio resource control (RRC) signaling to a user equipment, a receiver configured to receive channel state information determined according to a typical transmission time interval based channel state information transmission period and a short transmission time interval based channel state information transmission period from the user equipment, and a controller configuring downlink data transmission for the user equipment and configured to determine relevant parameters based on the received channel state information, wherein the typical transmission time interval is configured with 12 or 14 symbols, and the short transmission time interval is configured with 2, 4 or 7 symbols, wherein the short transmission time interval based channel state information transmission period is determined based on the information on the type of the short transmission time interval.

Effects of the Invention

In accordance with the embodiments described above, in a short TTI based frame structure, it is enabled to estimate channel state information and to transmit and receive the estimated channel state information.

BRIEF DESCRIPTION OF THE DRAWINGS

FIG. 2 is a diagram illustrating resource mapping for each physical resource block (PRB) in a single subframe.

BEST MODE FOR CARRYING OUT THE INVENTION

Figure 1:
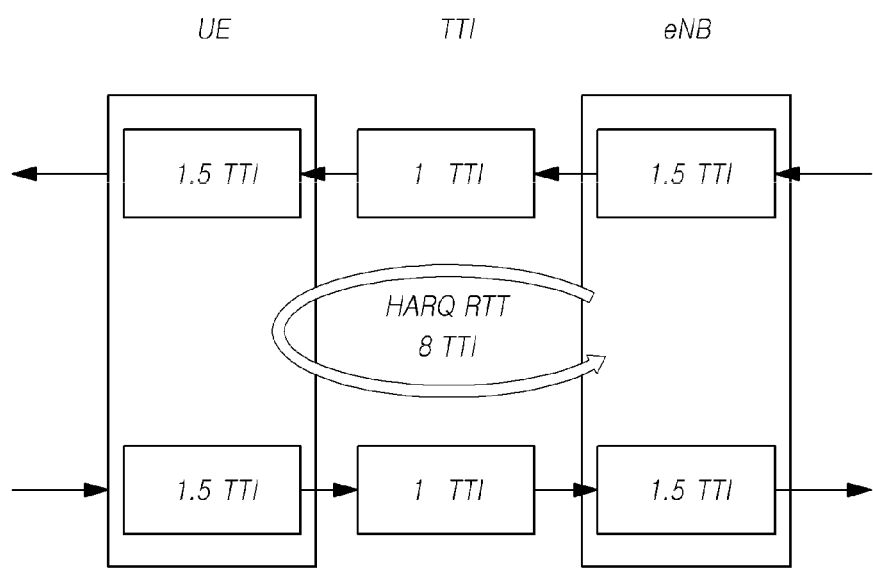
FIG. 1 is a diagram illustrating processing delays and a hybrid automatic repeat request (HARQ) round trip time (RTT) in a base station and a user equipment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, an machine type communication (MTC) device may refer to a device supporting low cost (or low complexity), a device supporting coverage enhancement, or the like. In the present disclosure, the MTC device may refer to a device supporting low cost (or low complexity), a device supporting coverage enhancement, and the like. In addition, in the present disclosure, the MTC device may refer to a device classified into a specific category for supporting low cost (or low complexity) and/or coverage enhancement.

In other words, in the present disclosure, the MTC device may refer to a low cost (or low complexity) user equipment (UE) category/type newly defined in 3GPP Release-13 and performing LTE-based MTC-related operations. In the present disclosure, the MTC device may refer to a UE category/type defined in or before 3GPP Release-12, which supports enhanced coverage in comparison with the typical LTE coverage or supports low power consumption, or may refer to a low cost (or low complexity) UE category/type newly defined in Release-13.

In the present disclosure, a wireless communication system is widely deployed to provide various communication services, such as a voice communication service, a packet data service, etc. The wireless communication system includes a user equipment (UE) and a base station (BS, or eNB). In the present disclosure, the UE is defined as a generic term including terminals used in wireless communication, and therefore includes, as well as UEs in wideband code division multiple access (WCDMA), LTE, high speed packet access (HSPA), and the like, a mobile station (MS) in global systems for mobile communication (GSM), a user terminal (UT), a subscriber station (SS), a wireless device, or the like.

A BS or a cell generally refers to a station communicating with the UE. The BS or the cell may be referred to as a Node-B, an evolved Node-B (eNB), a sector, a site, a base transceiver system (BTS), an access point, a relay node, a remote radio head (RRH), a radio unit (RU), a small cell, or the like.

That is, in the present disclosure, the BS or the cell is defined as a generic term including, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Since each of the above-described various cells is controlled by a BS, therefore the BS may be classified into two categories. The BS may be referred to i) an apparatus that provides a megacell, a macrocell, a microcell, a picocell, a femtocell, or a small cell, in association with a radio area, or ii) the radio area itself. In the case of i), the BS may be referred to all apparatuses providing any radio area, which are controlled by the same entity, or which interact to configure the radio area in cooperation with one another. According to a method of establishing a radio area, an example of the BS may be an eNB, a RRH, an antenna, a RU, a low power node (LPN), a point, a transmission/reception point, a transmission point, a reception point, or the like. In the case of ii), the BS may be a radio area itself for enabling UEs to receive signals from or to transmit signals to the other UEs or neighboring BS.

Accordingly, the megacell, the macrocell, the microcell, the picocell, the femtocell, or the small cell, the RRH, the antenna, the RU, the LPN, the point, the eNB, the transmission/reception point, the transmission point, or the reception point are collectively referred to as the BS.

In the present disclosure, the UE and the BS are two entities for performing transmission/reception used to embody the technology and technical spirit described in the present specification. The UE and the BS are defined as a generic term and not limited to specific terms or words. The UE and the BS are two entities for performing uplink or downlink transmission/reception used to embody the technology and technical spirit described in the present disclosure. The UE and the BS are defined as a generic term and not limited to specific terms or words. The uplink (UL) refers to data transmission/reception from a UE to a BS, and the downlink (DL) refers to data transmission/reception from a BS to a UE.

Any of multiple access techniques may be applied to the wireless communication system. The wireless communication system may use various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. At least one embodiment of the present disclosure may be applied to resource allocation in, as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not limited to or shall not be construed to be limited to a particular wireless communication field, and includes all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, according to the related standard, in some systems such as the LTE system or the LTE-advanced system, the UL and the DL are configured based on a single carrier or a pair of carriers. The UL and the DL may be established by one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like, through which control information is transmitted, and may be established by one or more data channels, such as a physical DL shared channel (PDSCH), a physical UL shared channel (PUSCH), or the like, through which data are transmitted.

Meanwhile, control information may be transmitted through an enhanced PDCCH (EPDCCH) or extended PDCCH (EPDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be at least one RRH that is connected to a BS or macrocell (hereinafter, referred to as 'eNB') through an optical cable or an optical fiber and thereby controlled in a wired manner, and that has high transmission power or low transmission power in a macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, signal transmission and reception through PUCCH, PUSCH, PDCCH, EPDCCH, or PDSCH may be described in "PUCCH, PUSCH, PDCCH, EPDCCH or PDSCH is transmitted, received."

In addition, hereinafter, a description of transmitting or receiving a PDCCH or a description of transmitting or receiving a signal through the PDCCH may be used as meaning including transmitting or receiving an EPDCCH or transmitting or receiving a signal through the EPDCCH.

That is, a physical DL control channel described below may mean the PDCCH or the EPDCCH, or is also used as meaning including both the PDCCH and the EPDCCH.

Also, for convenience of description, the EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel will be described in such a manner that a corresponding channel is transmitted/received.

Latency Reduction

Discussions have been conducted for reducing latency. The main purpose of the latency reduction is to standardize the operation of a short transmission time interval (hereinafter referred to as "short TTI" or "sTTI") to improve the throughput of the TCP.

Potential impacts and studies are in progress within the following ranges.

Assess specification impact and study feasibility and performance of TTI lengths between 0.5 ms and one OFDM symbol, taking into account impact on reference signals and physical layer control signaling.

Backwards compatibility shall be preserved (thus allowing normal operation of pre-Rel 13 UEs on the same carrier.)

Latency reduction can be achieved by the following physical layer techniques.

short TTI reduced processing time in implementation new frame structure of TDD

Discussions further have been in progress for reducing latency as follows.

Following design assumptions are considered:
No shortened TTI spans over subframe boundary.
At least for SIBs and paging, PDCCH and legacy PDSCH are used for scheduling.
The potential specific impacts for the followings are studied.
UE is expected to receive a sPDSCH at least for DL unicast.
sPDSCH refers PDSCH carrying data in a short TTI.
UE is expected to receive PDSCH for downlink unicast.
Whether a UE is expected to receive both sPDSCH and PDSCH for DL unicast simultaneously.
The number of supported short TTIs
Following design assumptions are used for the study.
From eNB perspective, existing non-sTTI and sTTI can be FDMed in the same subframe in the same carrier.
Other multiplexing method(s) with existing non-sTTI for UE supporting latency reduction features.
In this study, following aspects are assumed in RAN1.
PSS/SSS, PBCH, PCFICH and PRACH, random access, SIB and paging procedures are not modified.
Following aspects are further studied in the next RAN1 meeting.
Note: But the study is not limited to them.
Design of sPUSCH DM-RS
Alt.1: DM-RS symbol shared by multiple short-TTIs within the same subframe
Alt.2: DM-RS contained in each sPUSCH
HARQ for sPUSCH
Whether/how to realize asynchronous and/or synchronous HARQ
sTTI operation for Pcell and/or SCells by (e)CA in addition to non-(e)CA case FIG. 1 is a diagram illustrating processing delays and a HARQ round trip time (RTT) in a BS and a UE.

Basically, in the average downlink latency calculation, latency may be calculated according to the following procedures.

Following the same approach as in section B.2.1 in 3GPP TR 36.912, the LTE U-plane one-way latency for a scheduled UE consists of the fixed node processing delays and 1 TTI duration for transmission, as shown in Figure A.1 below. Assuming the processing times can be scaled by the same factor of TTI reduction keeping the same number of HARQ processes, the one way latency can be calculated as $D=1.5$ TTI (eNB processing and scheduling)+1 TTI (transmission)+1.5 TTI (UE processing)+$n*8$ TTI (HARQ retransmissions)=$(4+n*8)$ TTI.

Considering a typical case where there would be 0 or 1 retransmission, and assuming error probability of the first transmission to be p, the delay is given by $D=(4+p*8)$ TTI.

So, for 0% BLER (Block Error Rate), D=4*TTI,
And for 10% BLER, D=4.8*TTI.
Average UE initiated UL transmission latency calculation
Assume UE is in connected/synchronized mode and wants to do UL transmission, e.g., to send TCP ACK. Following table shows the steps and their corresponding contribution to the UL transmission latency. To be consistent in comparison of DL and UL, we add the eNB processing delay in the UL after the UL data is received by the eNB (step 7).

TABLE 1

| Step | Description | Delay |
|---|---|---|
| 1. | Average delay to next SR opportunity | SR periodicity/2 |
| 2. | UE sends SR | 1 TTI |
| 3. | eNB decodes SR and generates scheduling grant | 3 TTI |
| 4. | Transmission of scheduling grant (assumed always error free) | 1 TTI |
| 5. | UE processing delay (decoding Scheduling grant + L1 encoding of data) | 3 TTI |
| 6. | UE sends UL transmission | $(1 + p*8)$ TTI where p is initial BLER. |
| 7. | eNB receives and decodes the UL data | 1.5 TTI |

In the table above, steps 1-4 and half delay of step 5 is assumed to be due to SR, and rest is assumed for UL data transmission in values shown in Table 4.

Resource Mapping of Short TTI

In FIG. 2, the resource map above is the legacy resource mapping per PRB in one subframe, considering 2 Antenna ports and 2 OFDM symbols control field. In FIG. 2, the resource map below is the short TTI resource mapping, considering 2 OFDM symbols used for the control field in order to ensure the backward compatibility. The loss rates (Llegacy, e.g. 5%-50%) of the PHY layer in short TTI duration are assumed.

TBS Calculation of Short TTI

According to the resource mapping and the TBS calculation formula given above, the loss rate of PHY layer for legacy PDSCH is calculated as follows:

$$L_{legacy} = \frac{\text{the number of reference symbols within PDSCH}}{\text{the number of REs within PDSCH}} = \frac{12}{144} = 8.3\%$$

For different short TTI duration, The TBS of short TTI PDSCH is calculated as the following table:

TABLE 2

| TTI Duration | TBS of short TTI PDSCH ($TBS_{short}$) |
|---|---|
| 7 OFDM symbol | First time slot: $TBS_{short} = TBS_{legacy} \times \frac{60}{144} \times \frac{1 - L_{short}}{1 - 8.3\%}$ Second time slot: $TBS_{short} = TBS_{legacy} \times \frac{84}{144} \times \frac{1 - L_{short}}{1 - 8.3\%}$ |
| 2 OFDM symbol | $TBS_{short} = TBS_{legacy} \times \frac{24}{144} \times \frac{1 - L_{short}}{1 - 8.3\%}$ |
| 1 OFDM symbol | $TBS_{short} = TBS_{legacy} \times \frac{12}{144} \times \frac{1 - L_{short}}{1 - 8.3\%}$ |

Existing PUCCH

A PUCCH is a UL control channel transmitting a response to reception of a PDSCH by a UE to an eNB. The UE may use a PUCCH format of various formats to transmit Ack/Nack and CQI information for a downlink data channel to the eNB.

Figure 3:
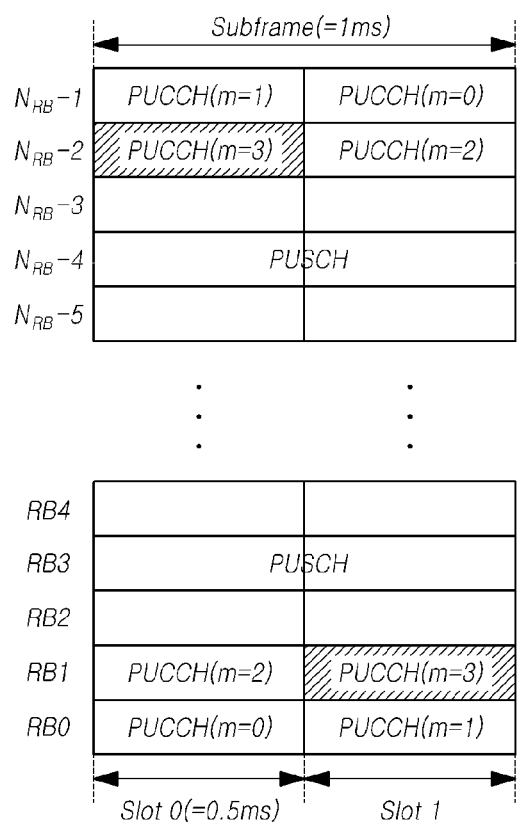
FIG. 3 is a diagram for explaining an uplink structure of a legacy physical uplink control channel (PUCCH).

In the LTE/LTE-Advanced frame structure (TTI=1 ms=14 OFDM symbols (Normal CP)/12 OFDM symbols (Extended CP)), slot based PUCCH hopping may be performed, as shown in FIG. 3. Such PUSCH hopping increases the frequency diversity of the PUCCH and as a result increases the coverage of the PUCCH. This is basically because the same signal or one information sequence is transmitted through frequency bands different from one another. Therefore, there is a gain that can obtain diversity.

Figure 4:
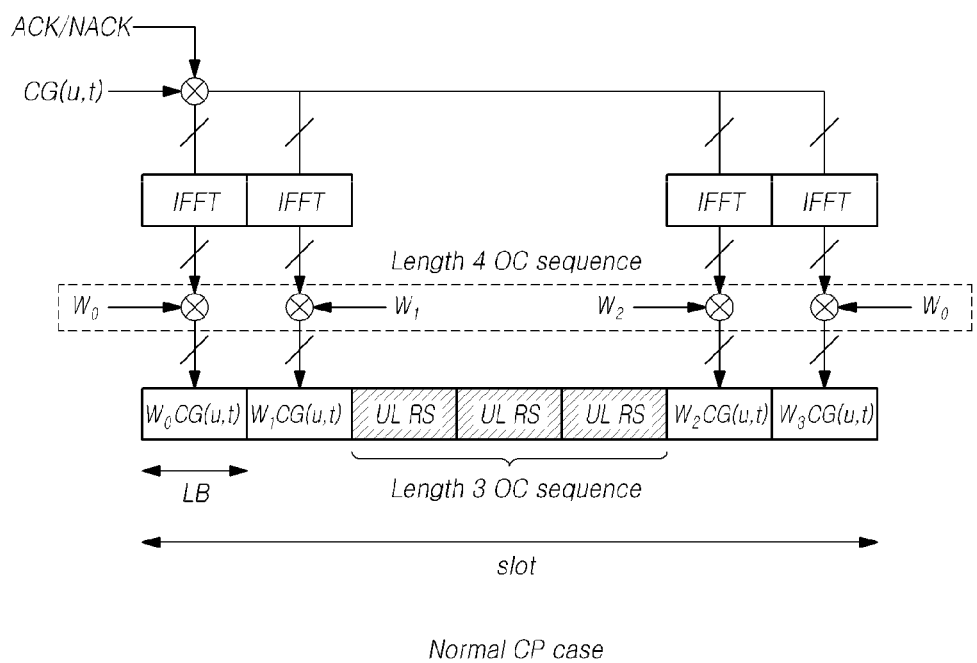
FIG. 4 is a diagram for explaining a configuration concept of a legacy PUCCH.

Resource allocation for transmitting Ack/Nack through legacy PUCCH is applied with OCC (spreading)+CS (cyclic shift) based on format 1a and 1b. As shown in FIG. 4, the legacy PUCCH is configured with 3 RS symbols and 4 Ack/Nack symbols on a slot basis.

In the present disclosure, proposed is a CS-based Ack/Nack multiplexing resource allocation of a Zadoff-Chu (ZC) sequence except for the legacy OCC considering that the number of symbols of sPUCCH reduces. Unlike the legacy structure, the OCC spreading is not used in this case.

The ZC sequence can be basically defined by a cyclic shift value defined in RS $r_{u,v}^{(\alpha)}(n)$ below.

$$r_{u,v}^{(\alpha)}(n) = e^{j\alpha n}\bar{r}_{u,v}(n),\ 0 \leq n < M_{sc}^{RS} \quad \text{[Equation 1]}$$

In this disclosure, the following basic structure is assumed to configure sPUCCH Ack/Nack without using the OCC.

In this case, dynamic resource allocation is performed for PUCCH formats 1a/b, and basically dynamic allocation as in the following equation is performed based on a CCE index of a scheduled PDCCH.

$$n_{PUCCH}^{(1,\tilde{p}0)} = n_{CCE} + N_{PUCCH}^{(1)} \quad \text{[Equation 2]}$$

In this case, a PUCCH resource index $n_{PUCCH}^{(1,\tilde{p}0)}$ for Ack/Nack is determined by a lowest CCE index $n_{CCE}$ of a PDCCH used for DCI transmission used to DL resource allocation and transmitted from a higher layer. In this case, $N_{PUCCH}^{(1)}$ denotes a kind of shift value set to separate the PUCCH formats 1a/1b from other PUCCH formats 2/3/4 etc.

Additional recent agreements regarding the sTTI are as follows.

Specify support for a transmission duration based on 2-symbol sTTI and 1-slot sTTI for sPDSCH/sPDCCH.
Specify support for a transmission duration based on 2-symbol sTTI, 4-symbol sTTI, and 1-slot sTTI for sPUCCH/sPUSCH.
Down-selection is not precluded.
Study any impact on CSI feedback and processing time, and if needed, specify necessary modifications.
For FS 1, 2 & 3, a minimum timing n+3 is supported for UL grant to UL data and for DL data to DL HARQ for UEs capable of operating with reduced processing time with only the following conditions:
A maximum TA is reduced to x ms, where x<=0.33 ms (exact values will be derived through detailed studies.)
At least when scheduled by PDCCH
For FS2, new DL HARQ and UL scheduling timing relations will be defined.
Details FFS (For Further Study)
FFS
Possible minimum timing of n+2 TTI
FFS max TA in this case
FFS what other restrictions (if any) on when reduced processing times of n+2 could be applied.
Possibility of scheduling by EPDCCH.
Reduced processing time(s) are RRC configured for the UE.
A mechanism for dynamic fallback to legacy processing timings (n+4) is supported.
For sPDSCH based on a CRS based transmission scheme the maximum number of supported layers is 4.
For sPDSCH based on a DM-RS based transmission scheme shall be down-selected among the following options.
The maximum number of supported layers is 2.
The maximum number of supported layers is 4.
The maximum number of supported layers is 8.
FFS for sPDSCH based on a DM-RS based transmission scheme it is recommended to increased PRB bundling size compared to PDSCH for at least sTTI lengths shorter than 1-slot.

As described above, although studies on the physical layer with regard to the short TTI are in progress, there is no procedure for CQI estimation and feedback on the sTTI basis.

Embodiments described below may be applied to all UEs, BSs, and core network entities (MME) using mobile communication technologies. For example, embodiments of the present disclosure may be applied not only to mobile communication UEs to which LTE technology is applied, but also to next generation mobile communication (5G mobile communication, New-RAT) UEs, BSs, and access and mobility functions (AMFs). For convenience of description, a BS may denote an eNB of LTE/E-UTRAN, or the BS denote a gNB in a 5G radio network where a central unit (CU) is separated from a distribute unit (DU). In particular, the gNB may be implemented as at least one of the CU, the DU, and one logical object implemented to include both of the CU and the DU.

In addition, a typical/normal transmission time interval or an existing/legacy/typical time interval described in the present disclosure denotes a subframe time interval of 1 ms used in the LTE/LTE-Advanced. That is, the time interval may be 14 symbols or 12 symbols, because the time interval of one subframe is 1 ms and may be made up of 14 symbols in the case of normal CP or 12 symbols in the case of extended CP in the LTE/LTE-Advanced. Accordingly, in the following embodiments, what is expressed as existing, legacy or typical may refer to the LTE/LTE-Advanced system with the sub-frame of 1 ms.

In addition, types of short transmission time interval described herein are for distinguishing the symbol length of the TTI in the short transmission time interval. Specifically, the symbol length means the number of symbols composing one short transmission time interval.

In general, channel state information (CSI) includes all of CQI, PMI, and RI. In the following description, only CQI is illustrated for some CSI descriptions, but the present disclosure is not limited to thereto.
CSI: Channel state information
CQI: Channel Quality Indicator
PMI: Precoding Matrix indicator
RI: Rank Indicator In the sTTI structure, a frame length is basically shorter than the legacy subframe (=1 ms), so that there may be a problem of being restricted by space. Therefore, it may be difficult to derive broadband channel estimation based channel state information such as the CRS of the legacy systems. To address this issue, the present disclosure describes a new method for channel state information estimation and feedback to support the short TTI structure.

Typical CQI reporting is briefly described below.

For example, a typical CQI reporting period may be determined by Equation 3 below. Specific values of parameters used in this equation are transmitted with an RRC signal (CQI-ReportConfig message), and it is normally noted that the period of transmitting the CQI is the subframe. That is, it may be identified through $N_{pd}$=2, 5, 10, . . . .

$$(10 \times n_f + \lfloor n_s/2 \rfloor - N_{OFFSET,CQI}) \mod (N_{pd}) = 0 \quad \text{[Equation 3]}$$

In Equation 3, i) $n_f$ denotes a system frame number (SFN), ii) $n_s$ denotes a slot number in a radio frame, iii) $N_{OFFSET,CQI}$ denotes an offset for a CQI reporting period in the subframe, and iv) $N_{pd}$ denotes the CQI reporting period in the subframe.

As shown in Table 3, the $N_{pd}$ and the $N_{OFFSET,CQI}$ may be determined by a CQI-PMI configuration index parameter ($I_{CQI/PMI}$).

TABLE 3

| $I_{CQI/PMI}$ | Value of $N_{pd}$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | | Reserved |

In addition, an example of Equation 4 below represents the period of simultaneously transmitting the CQI and the RI. Specific values of corresponding parameters are transmitted with the RRC signal (CQI-ReportConfig message), and it is normally noted that the period of transmitting the CQI is the subframe. Unlike CQI only reporting, becomes a transmission period.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 4]}$$

In Equation 4, i) $n_f$ denotes a system frame number (SFN), ii) $n_s$ denotes a slot number in a radio frame, iii) $N_{OFFSET,CQI}$ denotes an offset for a CQI reporting period in the subframe, and iv) $N_{pd}$ denotes the CQI reporting period in the subframe. In addition, $N_{OFFSET,RI}$ denotes an offset for a period of reporting RI in the subframe, and $M_{R1}$ denotes a number by which the RI reporting period is multiplied to get a multiple of the CQI reporting period.

As shown in Table 4, $M_{RI}$ and $N_{OFFSET,RI}$ may be determined by a RI configuration index parameter ($I_{RI}$).

TABLE 4

| $I_{RI}$ | Value of $M_{RI}$ | Value of $N_{OFFSET, RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ | | Reserved |

However, described herein is a method of additional CSI reporting for a short transmission time interval (sTTI), which may be operable separately from the typical CSI reporting. Basically, the sTTI is based on the assumption that the typical CRS, PCFICH, PDCCH, PBCH, PRACH, and the like are not modified, and one or more of them are overlaid with a typical area or multiplexed into a part of the typical area. In addition, additional CSI reporting, as well as typical A/N, may be performed through sPUCCH. Therefore, proposed herein is an additional operation required for the typical CQI estimation.

Figure 5:
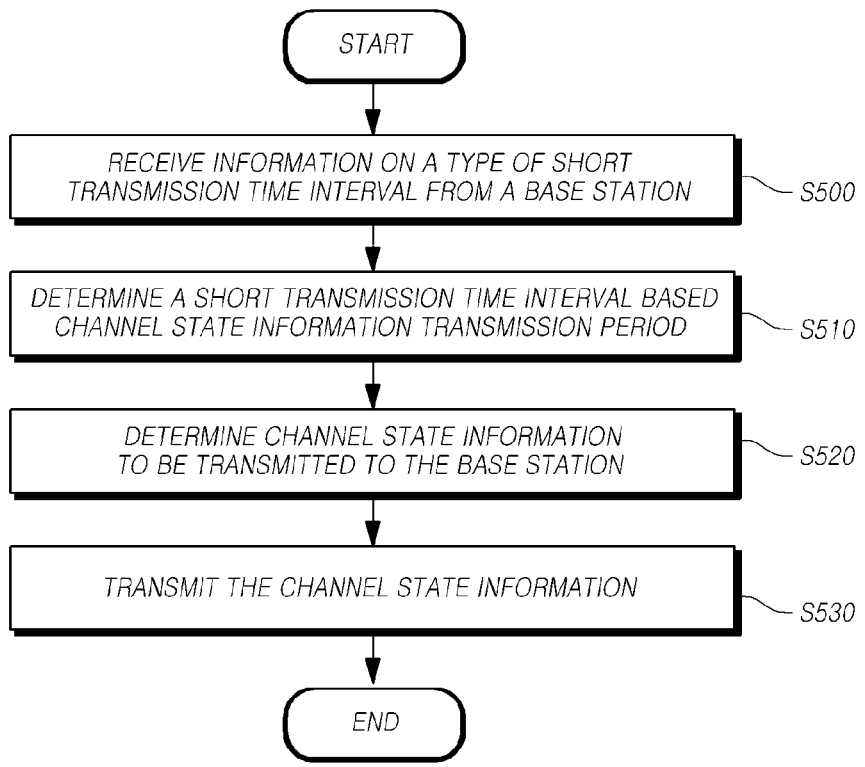
FIG. 5 is a diagram illustrating a procedure for a user equipment to transmit channel state information in a frame structure with a short transmission time interval, according to at least one embodiment of the present disclosure.

FIG. 5 is a diagram illustrating a procedure for a UE to transmit channel state information in a frame structure with a short transmission time interval, according to at least one embodiment of the present disclosure.

Referring to FIG. 5, a UE may receive information on a type of the short transmission time interval through RRC signaling from a BS (S500). More specifically, parameters related to a CQI reporting period may be transmitted with a CQI-ReportConfig message.

In addition, the UE may determine a short transmission time interval based channel state information transmission period based on the received information on the type of the short transmission time interval (S510). As described above, the number of symbols composing one transmission time interval may be changed according to the type of the short transmission time interval.

The short transmission time interval based channel state information transmission period may be determined by a function taking the information on the type of the short transmission time interval received from the BS as a parameter.

In addition, the UE may determine channel state information to be transmitted to the BS according to a typical transmission time interval based channel state information transmission period and the short transmission time interval based channel state information transmission period (S520).

For example, it may occur that a typical transmission time interval based channel state information transmission time may overlap with a short transmission time interval based channel state information transmission time. In this case, since two channel state information values may be different from each other, the UE may determine one of the channel state information values, to be transmitted to the BS. At this time, the UE may select and transmit one of typical transmission time interval based channel state information and short transmission time interval based channel state information to the BS. Alternatively, the UE may select and transmit one of the average value, maximum value and minimum value of the typical transmission time interval based channel state information and the short transmission time interval based channel state information to the BS.

As another example, the channel state information may be an offset value between the typical transmission time interval based channel state information and the short transmission time interval based channel state information. It is necessary to reduce the number of bits because the short transmission time interval based channel state information is transmitted through the sPUCCH and there is a limitation on the number of symbols of the sPUCCH. Accordingly, the UE may transmit only an offset value based on the typical transmission time interval based channel state information that the UE has. In this case, only the 3-bit or 2-bit offset value may be transmitted to the BS.

At this time, the offset value may be derived by channel estimation for each port of the CRS on the basis of a symbol (s) or a slot(s) corresponding to the length of the short transmission time interval. In addition, the offset value may be derived by channel estimation for each port of the DM-RS on the basis of a symbol (s) or a slot(s) corresponding to the length of the short transmission time interval. In addition, if a new RS for the short transmission time interval is defined, additional channel estimation may be performed using the corresponding RS.

In addition, the UE may transmit the channel state information to be transmitted to the BS through an uplink control channel in the short transmission time interval (S530).

In this case, in the process of FIG. 5, the typical transmission time interval may be set to 1 ms subframe, that is, 12 or 14 symbols, and the short transmission time interval may be set to 2, 4, or 7 symbols. As described above, 12 and 14 symbols respectively are the number of symbols composing one subframe in the extended CP and the normal CP in the typical transmission time interval, and 2, 4, or 7 symbols are the number of symbols composing one TTI, which are being considered in the sTTI.

Figure 6:
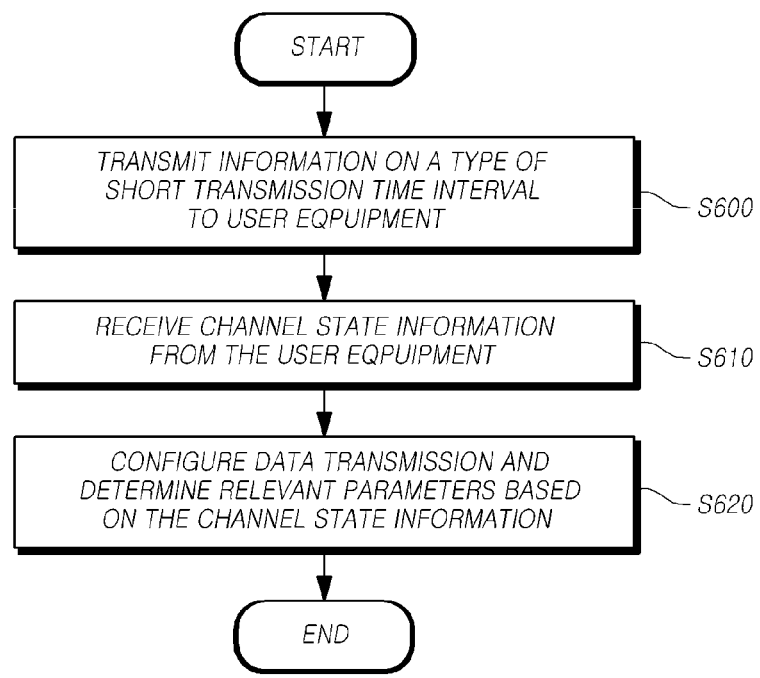
FIG. 6 is a diagram illustrating a procedure for a base station to receive channel state information in a frame structure with a short transmission time interval, according to at least one embodiment of the present disclosure.

FIG. 6 is a diagram illustrating a procedure for a BS to receive channel state information in a frame structure with a short transmission time interval, according to at least one embodiment of the present disclosure.

A BS may transmit information on a type of the short transmission time interval to a UE through RRC signaling (S600). More specifically, parameters related to a CQI reporting period may be transmitted with a CQI-ReportConfig message.

In addition, the BS may receive channel state information determined according to a typical transmission time interval based channel state information transmission period and a short transmission time interval based channel state information transmission period from a UE (S610). As described above, the UE may determine the channel state information to be transmitted to the BS according to the typical transmission time interval based channel state information transmission period and the short transmission time interval based channel state information transmission period.

At this time, the received channel state information is determined based on the information on the type of the short transmission time interval, and the typical transmission time interval may be set to 1 ms subframe, that is, 12 or 14 symbols, and the short transmission time interval may be set to 2, 4, or 7 symbols. As described above, 12 and 14 symbols respectively are the number of symbols composing one subframe in the extended CP and the normal CP in the typical transmission time interval, and 2, 4, or 7 symbols are the number of symbols composing one TTI, which are being considered in the sTTI.

At this time, it may occur that a typical transmission time interval based channel state information transmission time may overlap with a short transmission time interval based channel state information transmission time. In this case, since two channel state information values may be different from each other, the UE may determine one of the channel state information values, to be transmitted to the BS. At this time, the channel state information value transmitted by the UR to the BS may be determined as one of the typical transmission time interval based channel state information and the short transmission time interval based channel state information, or determined as one of the average value, maximum value and minimum value of the typical transmission time interval based channel state information and the short transmission time interval based channel state information.

As another example, the channel state information may be an offset value between the typical transmission time interval based channel state information and the short transmission time interval based channel state information.

At this time, the offset value may be derived by channel estimation for each port of the CRS on the basis of a symbol (s) or a slot(s) corresponding to the length of the short transmission time interval. In addition, the offset value may be derived by channel estimation for each port of the DM-RS on the basis of a symbol (s) or a slot(s) corresponding to the length of the short transmission time interval. In addition, if a new RS for the short transmission time interval is defined, additional channel estimation may be performed using the corresponding RS.

In addition, the BS may configure downlink data transmission for the user equipment and determine relevant parameters, based on the received channel state information (S620).

Hereinafter, various embodiments related to methods for transmitting/receiving channel state information between a UE and a BS in a frame structure with a short transmission time interval will be described in detail. Hereinafter, embodiments described below may be used individually or in any combination.

Embodiment 1. Introducing a New CSI Reporting Mode for the sTTI, Separated from a Legacy CSI Reporting Mode In this embodiment, it is possible to apply a new CSI reporting mode capable of performing channel state information reporting (CSI reporting) based on a smaller unit than the subframe, other than the legacy channel state information reporting mode (CSI reporting mode). That is, unlike the legacy CSI reporting, reporting may be performed on a specific number of symbols basis.

For example, since the number of symbols differs according to types of the sTTI, the following definitions are required. In current standardization of the sTTI, only sTTIs of 2, 4, and 7 symbols are considered, therefore the number of symbols according to types of the sTTI can be defined as shown in Table 5.

TABLE 5

Number of symbols according to sTTI type

| sTTI type | Number of symbols |
|---|---|
| Type-0 | 2 |
| Type-1 | 4 |
| Type-2 | 7 |

Here, $N_{pd}$ of the Equation 3 may be newly defined as $N_{pd,i}$. In this case, i=0, 1 or 2, and is converted into a length of symbols according to types of the sTTI. Here, the length of the symbols means the number of symbols composing one sTTI.

Therefore, basically, modifications are made as follows in order to configure a period in the equation 3. At this time, it is necessary for typical parameters also to be modified on a symbol(s) basis. Accordingly, a channel state information reporting period in the sTTI may be determined by Equation 5 below.

$$(10 sn_f + *n_s/2 + -N_{OFFSET,CQI}) \mod (N_{pd,i}) = 0 \quad \text{[Equation 5]}$$

In Equation 3, i) $n_f$ denotes a system frame number (SFN), ii) $n_s$ denotes a slot number in a radio frame, iii) $N_{OFFSET,CQI}$ denotes an offset for a CQI reporting period in the subframe, and iv) $N_{pd,i}$ denotes a CQI reporting period determined according to types of the sTTI.

Alternatively, it is also possible to convert the entire unit(s) into a sub-frame or an index of the sub-frame, of the sTTI.

Figure 7:
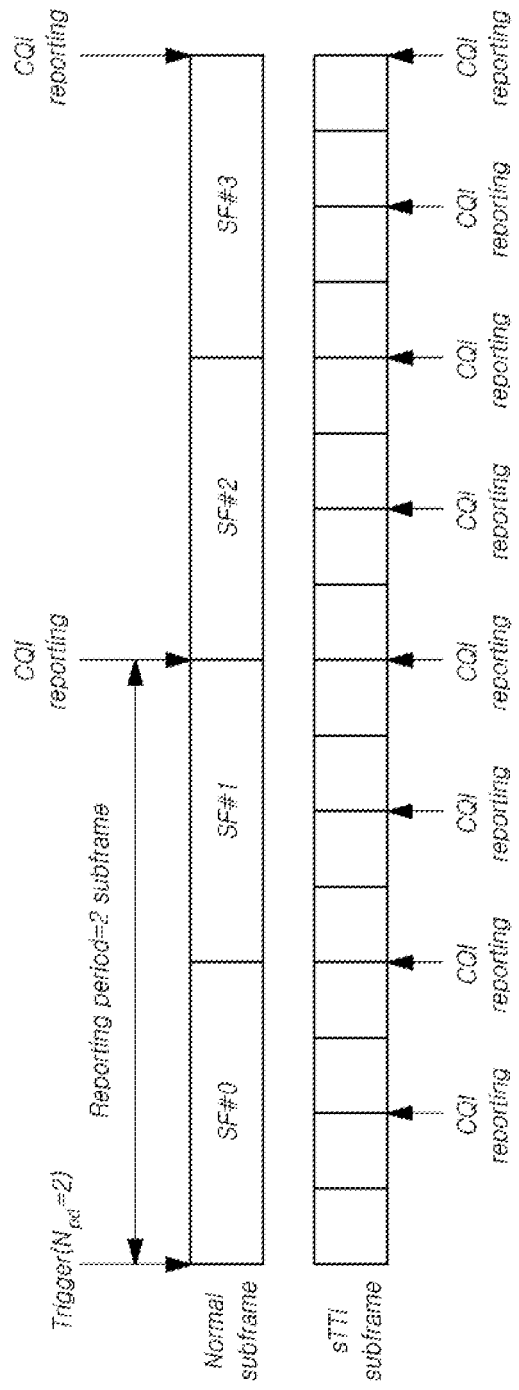
FIG. 7 is a diagram for explaining that a channel state information (CSI) reporting mode using a short transmission time interval is separated from that using a typical transmission time interval.

According to the CQI reporting methods discussed above, it is possible to implement CQI reporting as shown in FIG. 7.

Figure 8:
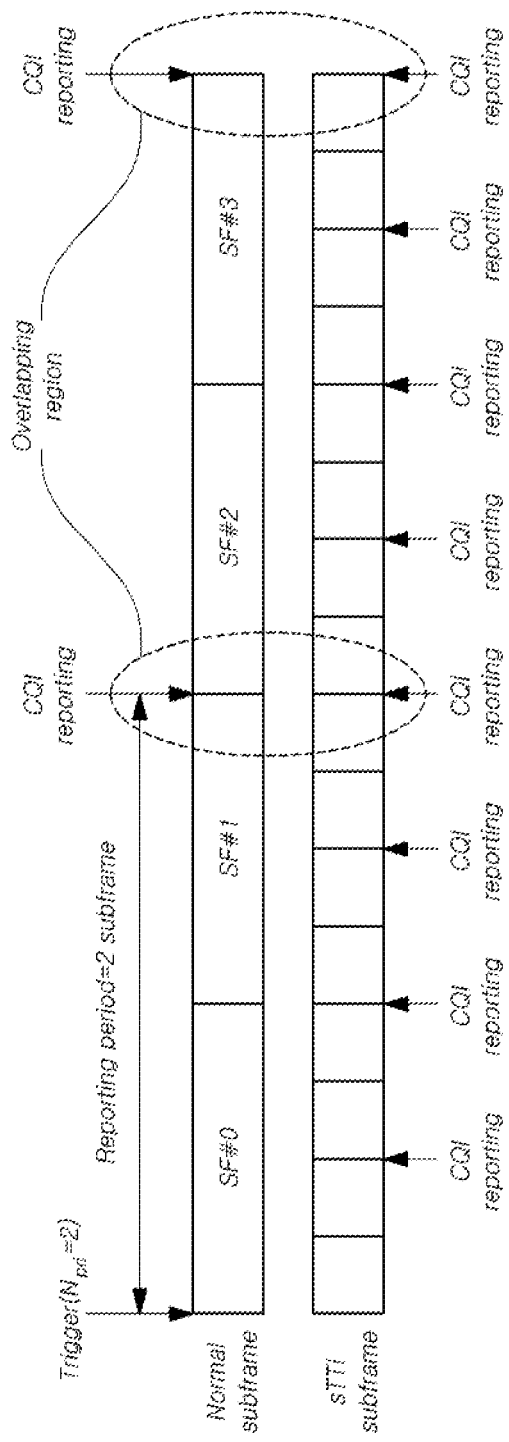
FIG. 8 is a diagram for explaining that a channel state information (CSI) reporting mode using a short transmission time interval overlaps with that using a typical transmission time interval.

Embodiment 2. Selecting One Mode Preferentially when Legacy CSI Reporting and sTTI CSI Reporting Overlaps In this embodiment, UE's behavior is defined, when CSI reporting modes overlaps. FIG. 8 shows an area where a channel state information (CSI) reporting mode using the short transmission time interval overlaps with that using the legacy transmission time interval.

Basically, when the two types of CSI reporting are performed at the same time, it is normal for the UE to perform the two types of CSI reporting at the same time without the authority to select one of the two types of CSI reporting. In the following embodiments, it is assumed that the UE performs the two types of CSI reporting at the same time. However, if the UE can select a CSI value to be reported when the two types of CSI reporting overlaps, the UE may integrate two CSI values into one value or omit one CSI reporting.

Embodiment 2-1 Using a Legacy CSI Reporting Value when the Legacy CSI Reporting and the sTTI CSI Reporting Overlaps The UE may unconditionally select a legacy channel state information reporting value as a channel state information reporting value to be reported to the BS when the two types of CSI reporting overlaps.

Embodiment 2-2 Using an sTTI CSI Reporting Value when the Legacy CSI Reporting and the sTTI CSI Reporting Overlaps The UE may unconditionally select an sTTI channel state information reporting value as a channel state information reporting value to be reported to the BS when the two types of CSI reporting overlaps.

Embodiment 2-3 Using the Average Value of CSI Reporting Values when the Legacy CSI Reporting and the sTTI CSI Reporting Overlaps When the two types of CSI reporting overlaps, the UE may calculate the average value of a legacy channel state information reporting value and an sTTI channel state information reporting value, and then select the calculated average value as a channel state information reporting value to be reported to the BS.

Embodiment 2-4 Using the Maximum Value of CSI Reporting Values when the Legacy CSI Reporting and the sTTI CSI Reporting Overlaps When the two types of CSI reporting overlaps, the UE may compare the size of a legacy channel state information reporting value with the size of an sTTI channel state information reporting value, and then select the maximum value as a channel state information reporting value to be reported to the BS.

Embodiment 2-5 Using the Minimum Value of CSI Reporting Values when the Legacy CSI Reporting and the sTTI CSI Reporting Overlaps When the two types of CSI reporting overlaps, the UE may compare the size of a legacy channel state information reporting value with the size of an sTTI channel state information reporting value, and then select the minimum value as a channel state information reporting value to be reported to the BS.

Figure 9:
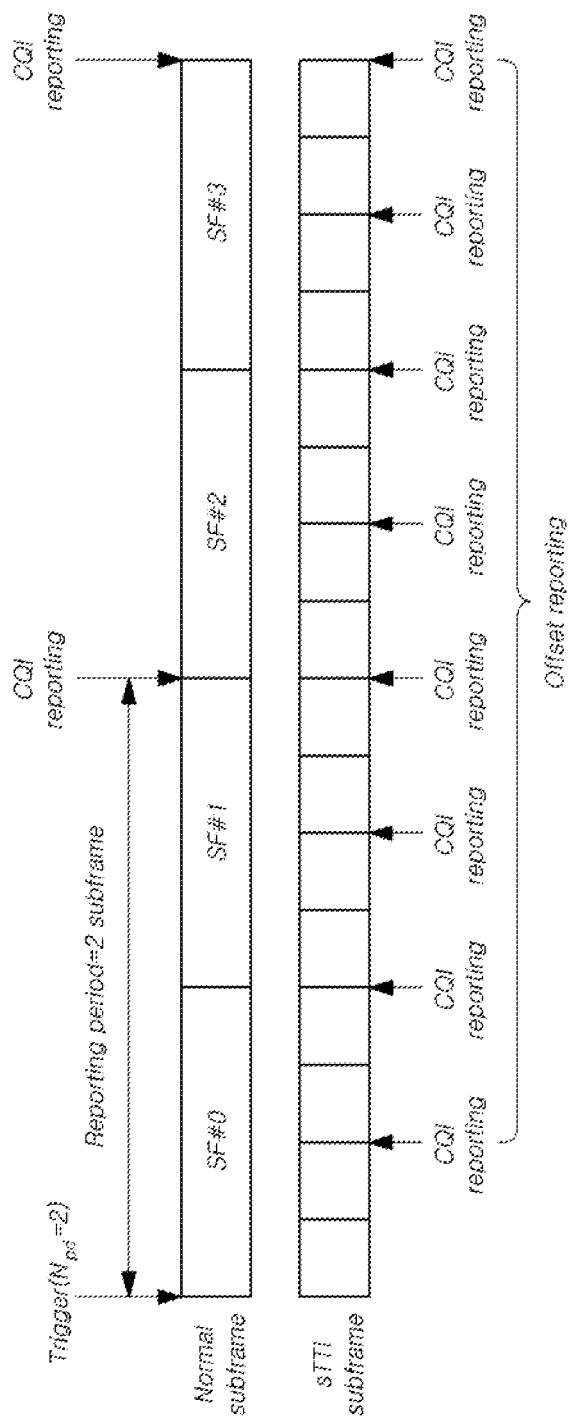
FIG. 9 is a diagram for explaining an offset-based channel state information (CSI) reporting mode in a short transmission time interval.

Embodiment 3. sTTI CSI Reporting is Performed by Transmitting Only Offset Against the Legacy CSI Reporting Value CSI reporting in the sTTI is performed for the sPUCCH. However, unlike the typical PUCCH, in the sPUCCH, since the number of symbols is limited, and therefore there exists no area capable of transmitting CSI of up to 11 bits. Accordingly, when performing CSI reporting in addition to A/N over the sPUCCH, it is advantageous to perform the least bit(s). In particular, an offset value of an sTTI CQI may be derived based on a legacy CQI reporting value. In this case, it is assumed that the legacy CSI reporting operation is performed normally. At this time, at the time of the sTTI CSI reporting, based on a legacy CSI reporting value that the UE already has, difference from the legacy CSI reporting value, that is, an offset only may be transmitted over the sPUCCH. FIG. 9 is a diagram for explaining an offset-based channel state information (CSI) reporting mode using the short transmission time interval.

For example, a typical 3-bit offset table may be reused, as shown in Table 6. If it is 2 bits, it is possible to set offset values as shown in Table 7. Accordingly, the number of bits used may be reduced compared to the case where an area(s) capable of transmitting CSI of up to 11 bits is used, as in the typical PUCCH.

TABLE 6

| Spatial differential CQI value | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

TABLE 7

| Spatial differential CQI value | Offset level |
|---|---|
| 0 | 0 |
| 1 | 1 |
| 2 | ≥2 |
| 3 | ≤−1 |

Embodiment 3-1. In Order to Derive CQI Offset of the sTTI, Channel Estimation is Performed with Each Port of a Typical Cell-Specific Reference Signal (CRS) on a Slot or a Symbol Basis, which Corresponds to the Length of the sTTI(s)

In this embodiment, the operation of a UE capable of performing channel estimation based on a legacy reference signal (RS) is further defined. In this embodiment, unlike the legacy CSI reporting, the unit of CSI estimation may be configured as a unit of a plurality of symbols or slots (=0.5 ms) that corresponds to the length of the sTTI(s), based on the CRS being no change in the sTTI. Therefore, the unit of the CSI reporting may be more detailed and frequent than the typical method of using the 1 ms subframe time interval.

Figure 10:
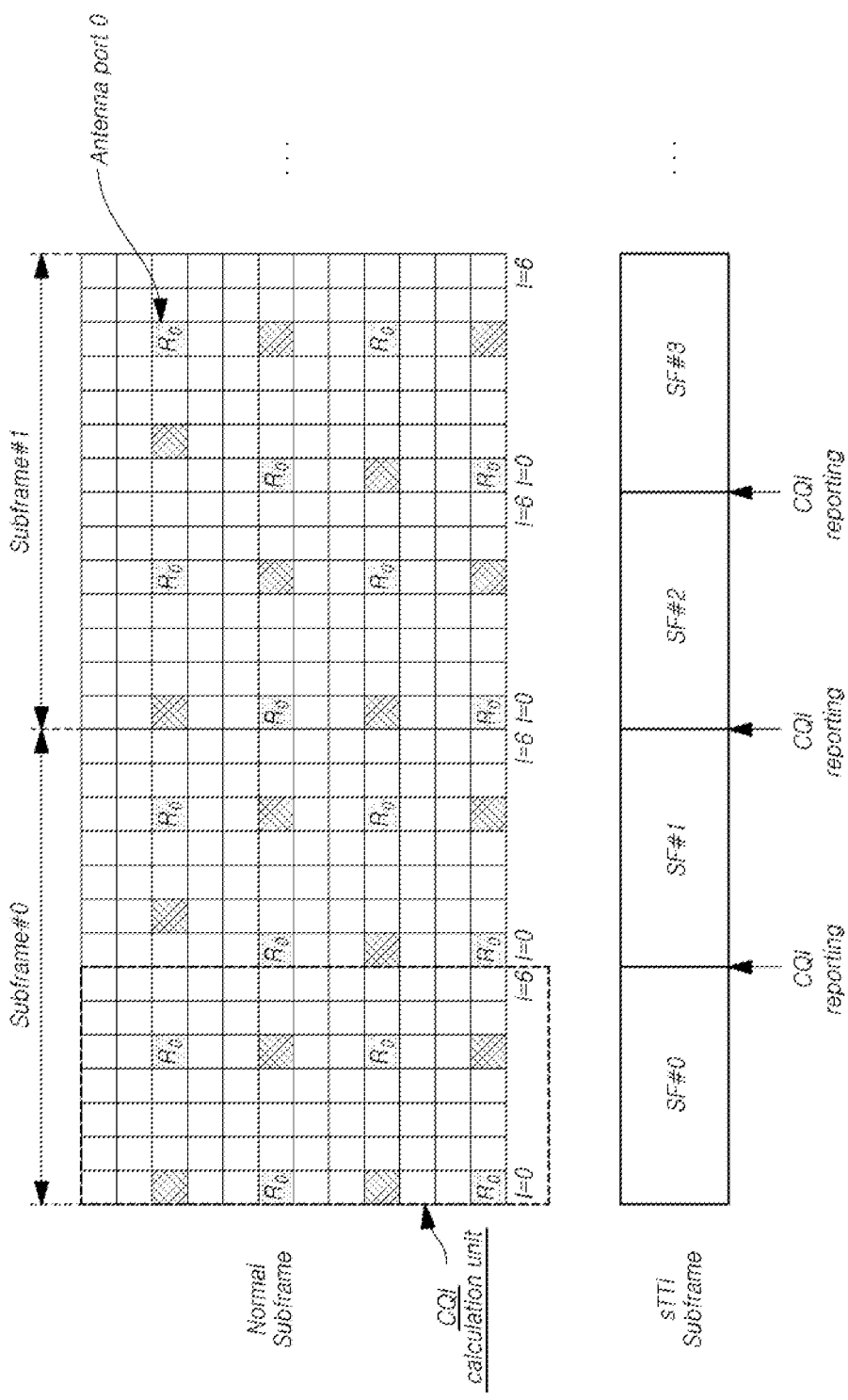
FIG. 10 is a diagram for explaining an example of CQI calculation of a short transmission time interval.

The method of estimating the CSI may reuse a typical corresponding procedure as it is. For example, a reference signal received quality (RSRQ) value, etc. may be derived based on a reference signal received power (RSRP) or a received signal strength indicator (RSSI) on a symbol or a slot basis. In addition, the CQI may be derived based on the derived values. In this case, the unit of the CQI derivation may include not only a few subframes to tens of subframes, but also a unit/length smaller than the subframe. FIG. 10 is a diagram for explaining an example of CQI calculation of the short transmission time interval.

Embodiment 3-2. In Order to Derive CQI Offset of the sTTI, Channel Estimation is Performed with Each Port of a Typical Demodulation Reference Signal (DMRS) on a Slot or a Symbol Basis, which Corresponds to the Length of the sTTI(s)

In this embodiment, the DMRS is used instead of the CRS in the Embodiment 3-1. Unlike the legacy CSI reporting, the unit of CSI estimation may be configured as a unit of a plurality of symbols or slots (=0.5 ms) that corresponds to the length of the sTTI(s). Therefore, the unit of the CSI reporting may be more detailed and frequent than the typical method of using the 1 ms subframe time interval.

The method of estimating the CSI may reuse a typical corresponding procedure as it is. For example, a reference signal received quality (RSRQ) value, etc. may be derived based on a reference signal received power (RSRP) or a received signal strength indicator (RSSI) on a symbol or a slot basis. In addition, the CQI may be derive based on the derived values. In this case, the unit of the CQI derivation may include not only a few subframe to tens of subframes, but also a unit/length smaller than the subframe.

Embodiment 3-3. In Order to Derive CQI Offset of the sTTI, Channel Estimation is Performed with a sPDSCH RS, a sPDSCH RS, or a DMRS A new additional DMRS may be considered for the sPDCCH/sPDSCH transmitted in each sTTI. If a new short DMRS for the sTTI is defined, additional channel estimation may be performed using a corresponding RS. For example, an offset value for the CQI may be derived through channel estimation for this short DMRS.

Figure 11:
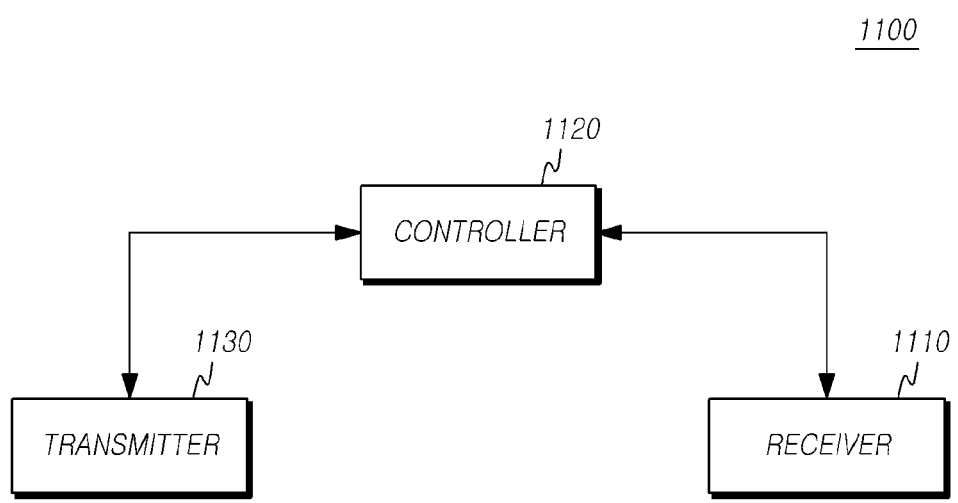
FIG. 11 is a diagram illustrating a base station, according to at least one embodiment of the present disclosure.

FIG. 11 is a diagram illustrating a base station according to at least one embodiment of the present disclosure.

Referring to FIG. 11, a BS 1100 according to embodiments of the present disclosure includes a receiver 1110, a controller 1120, and a transmitter 1130.

The controller 1120 is configured to control the overall operations of the BS 1100 for receiving channel state information in a frame structure with the short TTI according to the present disclosure described above.

More specifically, the controller configures downlink data transmission for a UE and determines relevant parameters, based on the received channel state information.

The receiver 1110 and the transmitter 1130 are configured to transmit/receive signals, messages, or data necessary for carrying out embodiments of the present disclosure described above, to/from the UE.

Specifically, the receiver 110 is configured to receive channel state information determined according to a typical transmission time interval based channel state information transmission period and a short transmission time interval based channel state information transmission period from a UE.

As described above, the typical transmission time interval may be set to 12 or 14 symbols, and the short transmission time interval may be set to 2, 4, or 7 symbols. The short transmission time interval based channel state information transmission period may be determined based on the information on a type of the short transmission time interval transmitted by the BS to the UE.

For example, as described above, when a typical transmission time interval based channel state information transmission time overlaps with a short transmission time interval based channel state information transmission time, the channel state information may be determined as one of the typical transmission time interval based channel state information and the short transmission time interval based channel state information, or determined as one of the average value, maximum value and minimum value of the typical transmission time interval based channel state information and the short transmission time interval based channel state information.

As another example, the channel state information may be an offset value between the typical transmission time interval based channel state information and the short transmission time interval based channel state information.

At this time, the offset value may be derived by channel estimation for each port of the CRS on the basis of a symbol (s) or a slot(s) corresponding to the length of the short transmission time interval. In addition, the offset value may be derived by channel estimation for each port of the DM-RS on the basis of a symbol (s) or a slot(s) corresponding to the length of the short transmission time interval.

Specifically, the transmitter 1130 is configured to transmit information on a type of the short transmission time interval to the UE through RRC signaling.

Figure 12:
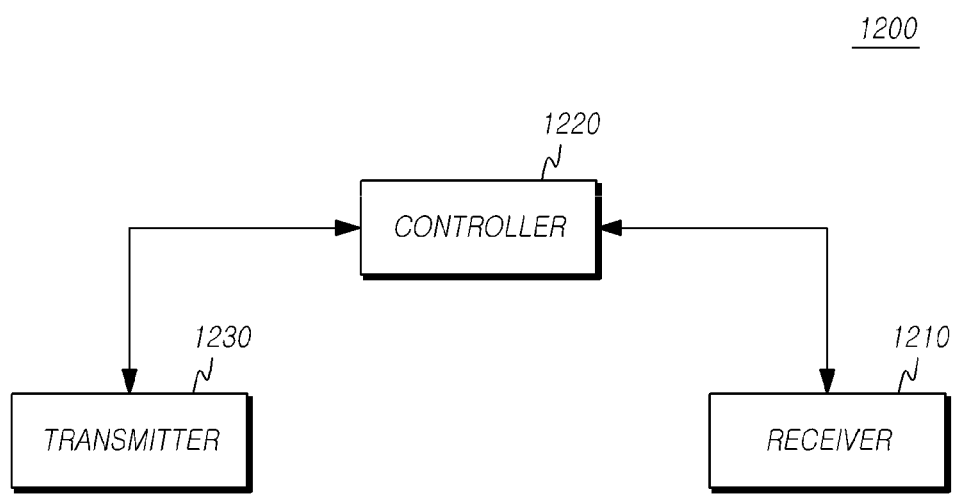
FIG. 12 is a diagram illustrating a user equipment, according to at least one embodiment of the present disclosure.

FIG. 12 is a diagram illustrating a UE according to at least one embodiment of the present disclosure.

Referring to FIG. 12, the UE 1200 according to embodiments of the present disclosure includes a receiver 1210, a controller 1220, and a transmitter 1230.

The receiver 1210 is configured to receive downlink control information, data, or messages from a BS through a corresponding channel.

Specifically, the receiver 1210 is configured to receive information on a type of the short transmission time interval from the BS through RRC signaling.

The controller 1220 is configured to control the overall operations of the UE 1200 for transmitting channel state information in a frame structure with the short TTI according to the present disclosure described above.

Specifically, the controller 1220 is configured to determine a short transmission time interval based channel state information transmission period based on the information on the type of the short transmission time interval received from the BS, and determine channel state information to be transmitted to the BS according to a typical transmission time interval based channel state information transmission period and the short transmission time interval based channel state information transmission period.

In this case, the typical transmission time interval may be set to 12 or 14 symbols, and the short transmission time interval may be set to 2, 4, or 7 symbols.

The short transmission time interval based channel state information transmission period may be determined by a function taking the information on the type of the short transmission time interval received from the BS as a parameter.

For example, as described above, when a typical transmission time interval based channel state information transmission time overlaps with a short transmission time interval based channel state information transmission time, the channel state information may be determined as one of the typical transmission time interval based channel state information and the short transmission time interval based channel state information, or determined as one of the average value, maximum value and minimum value of the typical transmission time interval based channel state information and the short transmission time interval based channel state information.

As another example, the channel state information may be an offset value between the typical transmission time interval based channel state information and the short transmission time interval based channel state information.

At this time, the offset value may be derived by channel estimation for each port of the CRS on the basis of a symbol (s) or a slot(s) corresponding to the length of the short transmission time interval. In addition, the offset value may be derived by channel estimation for each port of the DM-RS on the basis of a symbol (s) or a slot(s) corresponding to the length of the short transmission time interval.

The transmitter 1230 is configured to transmit uplink control information, data, or messages to the BS through a corresponding channel.

The present disclosure has proposed methods of estimating and transmitting the CQI based on the short TTI in the 3GPP LTE/LTE-Advanced systems. Specifically, sTTI-based CQI estimation methods and relevant processes have been discussed. These methods and/or their principles may be applied to similar signals and channels as are and therefore not limited to the sTTI frame structure.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of transmitting channel state information in a frame structure with a short transmission time interval by a user equipment, the method comprising:
receiving information on a type of the short transmission time interval from a base station through radio resource control (RRC) signaling;
determining the short transmission time interval based upon the received information;
determining a channel state information transmission period; and
transmitting the channel state information to the base station through an uplink control channel in the short transmission time interval,
wherein the channel state information is transmitted using a unit smaller than a subframe,
wherein the channel state information transmission period and offset is determined by a CQI-PMI configuration index parameter, and wherein the CQI-PMI configuration index parameter is received through RRC signaling.

2. The method according to claim 1, wherein the unit is set to equal to or under 1 slot.

3. The method according to claim 2, wherein the unit is set to equal to or under 4 symbols.

4. The method according to claim 3, wherein the unit is set to 2 symbols.

5. A method of receiving channel state information in a frame structure with a short transmission time interval by a base station from a user equipment, the method comprising:
transmitting information on a type of the short transmission time interval to the user equipment through radio resource control (RRC) signaling;
receiving the channel state information from the user equipment through an uplink control channel in the short transmission time interval;
wherein the channel state information is received using a unit smaller than a subframe,
wherein the channel state information transmission period and offset is determined by a CQI-PMI configuration index parameter, and wherein the CQI-PMI configuration index parameter is received through RRC signaling.

6. The method according to claim 5, wherein the unit is set to equal to or under 1 slot.

7. The method according to claim 6, wherein the unit is set to equal to or under 4 symbols.

8. The method according to claim 7, wherein the unit is set to 2 symbols.

9. A user equipment for of transmitting channel state information in a frame structure with a short transmission time interval, the user equipment comprising:
a receiver configured to receive information on a type of the short transmission time interval from a base station through radio resource control (RRC) signaling;
a controller configured to determine a short transmission time interval based on the received information; and
a transmitter configured to transmit the channel state information to be transmitted to the base station through an uplink control channel in the short transmission time interval,
wherein the channel state information is transmitted using a unit smaller than a subframe,
wherein the channel state information transmission period and offset is determined by a CQI-PMI configuration index parameter, and wherein the CQI-PMI configuration index parameter is received through RRC signaling.

10. The user equipment according to claim 9, wherein the unit is set to equal to or under 1 slot.

11. The user equipment according to claim 10, wherein the unit is set to equal to or under 4 symbols.

12. The user equipment according to claim 11, wherein the unit is set to 2 symbols.

* * * * *

UNITED STATES PATENT AND TRADEMARK OFFICE
CERTIFICATE OF CORRECTION

PATENT NO. : 10,849,111 B2  
APPLICATION NO. : 16/335717  
DATED : November 24, 2020  
INVENTOR(S) : Ki-tae Kim et al.

Page 1 of 1

It is certified that error appears in the above-identified patent and that said Letters Patent is hereby corrected as shown below:

In the Claims

In Claim 9, Column 20, Line 41, please replace "A user equipment for of" with --A user equipment for--;

In Claim 9, Column 20, Line 50, please replace "information to be transmitted to the" with --information to the--.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*